United States Patent [19]

Hansen et al.

[11] 4,187,577
[45] Feb. 12, 1980

[54] BLOWER ATTACHMENT FOR LINE TRIMMER

[76] Inventors: Lee A. Hansen; William A. Conrad, both of 712 N. Piedra, Sanger, Calif. 93657

[21] Appl. No.: 936,182

[22] Filed: Aug. 23, 1978

[51] Int. Cl.$^2$ .............................................. A47L 9/00
[52] U.S. Cl. ...................................... 15/328; 15/405; 29/156.4 R; 29/401.1; 30/122
[58] Field of Search ............... 15/328, 405, 406, 338; 30/122; 29/156.4 R, 401 B

[56] References Cited

U.S. PATENT DOCUMENTS

| 3,065,491 | 11/1962 | Amador | 15/396 |
| 3,286,376 | 11/1966 | Wildes | 15/338 X |
| 3,863,291 | 2/1975 | Woelffer | 15/328 |
| 3,871,052 | 3/1975 | Luckcuck | 15/328 |

Primary Examiner—Christopher K. Moore
Attorney, Agent, or Firm—Clarence A. O'Brien; Harvey B. Jacobson

[57] ABSTRACT

The device includes a blower impeller, a blower housing conformed to fit snugly over the bottom of a standard line trimmer, and stretch traps for maintaining the housing in position on the line trimmer. The device enables one to convert a line trimmer to a blower arrangement by the removal of the spool and head of the line trimmer and the attachment of the impeller, housing and straps in their place.

4 Claims, 3 Drawing Figures

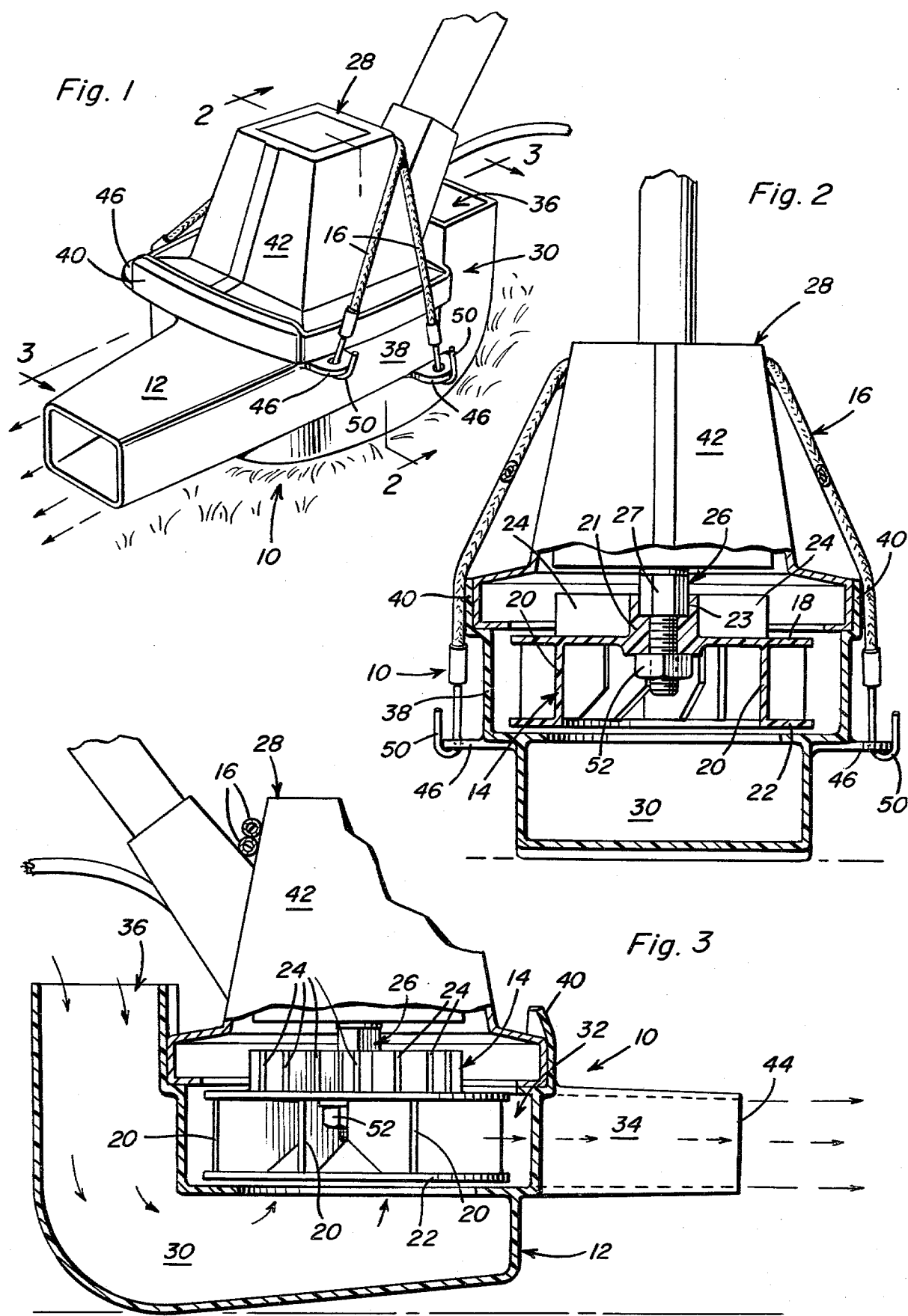

BLOWER ATTACHMENT FOR LINE TRIMMER

BACKGROUND OF THE INVENTION

1. Field of the Invention

This invention relates to attachment devices for line trimmers and especially for converting a line trimmer to a blower.

2. Description of the Prior Art

In the past, when it has been found to be necessary to remove grass clippings, leaves, and the like, from borders of lawns, sidewalks, driveways, and the like, it has been common practice to employ a hand-held instrument such as a rake, shovel or broom. In rare circumstances, a vacuum arrangement designed specifically for use in the out-of-doors has been employed for this purpose. The use of the manually manipulated devices mentioned may be time consuming as well as laborious if the area to be cleaned is at all extensive. The alternative of a vacuuming device is expensive in such devices normally prove to be quite bulky and, therefore, are ameniable to use only in large, wide open areas. There has, therefore, developed a need for a device which may easily remove the organic debris left after normal lawn care. Further, in view of the increased number of lawn and garden tools possessed by a modern home owner, there has been a need for additional tools which may incorporate portions of other tools in order to reduce the over-all expense of the initial tool purchase as well as conserve space used in storage of the devices.

SUMMARY OF THE INVENTION

It is one object of the present invention to provide a means of removing grass clippings, leaves, and other debris resulting from the normal grooming of vegetation from areas wherein these leavings may prove to be unsightly and thereby decrease the aesthetic appeal of the premises.

It is a further object of the present invention to provide a device which will remove debris easily and effectively and at the same time employ portions of other standardly available lawn and garden tools as a part thereof.

A still further object of the present invention is to provide a blower device for attachment to a line trimmer which device is economical to manufacture, easy to assemble and necessitates a minimum of storage space, yet is rugged and durable.

In accordance with the above objects, the present invention provides a blower impeller which is configured to fit upon the rotatable shaft of a standard line trimmer. The impeller is made of fiberglass or other durable material and is disposed within a blower housing which conforms to the surface area of the lower portion of the line trimmer. The housing provides a path whereby air may be drawn by the impeller and expelled through an outlet port for providing the means to remove debris. In order to provide for easy assembly of the device, stretchable straps are included for disposition within holes provided in the housing. The stretch straps extend around the line trimmer head and in this manner hold the housing in place.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a perspective view of the blower attachment positioned on a line trimmer.

FIG. 2 is a sectional view taken substantially along a plane passing through section line 2—2 of FIG. 1.

FIG. 3 is a sectional view taken substantially along a plane passing through section line 3—3 of FIG. 1.

DESCRIPTION OF THE PREFERRED EMBODIMENT

With reference to the drawings, the blower attachment for a line trimmer will be more thoroughly described. The blower attachment itself is generally referred to by the numeral 10. The attachment consists of blower housing 12, impeller 14 and stretch straps 16.

As is evident from the drawings, the impeller 14 consists of a circular disk 18 to which is attached a plurality of impeller blades 20. Structural support is provided to the impeller by an annular ring 22 which is attached to the opposite end of each impeller blade. The impeller blades radiate outwardly from a position which can be envisioned as being on the circumference of a circle which is concentric with the center of disk 18. Each impeller blade is formed according to standard design techniques and is angled with respect to a radius of the disk 18. The center of annular ring 22 forms the air intake for the impeller while the spaces between the impeller blades 20 provide the area through which the air is expelled. Attached in surmounting position to the disk 18 are a plurality of small radially extending blades 24. Blades 24 serve to provide air motion about the shaft 26 of the line trimmer 28 to prevent leaves, and the like, from becoming entwined with the shaft and provides cooling for the motor. Impeller 14 also is provided with a collar 21 which has an axis of rotation through the center of blades 24 and circular disk 18. The collar has an hexagonal indentation 23 for disposition about hexagonal portion 27 of shaft 26. The collar and shaft interact in this manner in order to prevent rotation of the impeller with respect to the shaft and thereby positive rotation of the impeller is insured.

Blower housing 12 consists of an air intake port 30 for presenting air to the impeller 14, an impeller chamber 32 and an air outlet port 34. Intake port 30 has an opening in the upper portion thereof directly beneath impeller 14. This port extends to the rear of the housing and has a vertically directed section which ends in air intake aperture 36. With the air intake aperture directed with a vertical orientation, the intake of fresh air is assured and the intake of stones, twigs, or other hard objects which might destroy the impeller blades is discouraged. If desired, a small screen or filter may be disposed in the air intake port in order to insure that no such objects would be admitted to the impeller chamber.

Impeller chamber 32 consists of a continuous surrounding wall 38 and includes an upwardly extending wall 40 for surrounding the head 42 of line trimmer 28.

Extending outwardly from the impeller chamber 32 and in substantial horizontal alignment with the forwardly advancing impeller blades of the rotor when in active rotation is outlet port 34. The outlet port has an outlet aperture 44 which directs the moving air in a horizontal plan parallel to the ground surface.

Four mounting brackets 46 are firmly attached to the housing 12 in positions extending laterally from the sides of the housing. These brackets have small holes disposed through them for accepting stretch straps 16. Each stretch cord or strap 16 has a solid U-shaped hook 50 connected to each end thereof. The hooks are disposed through the holes in the brackets and the cords are stretched over the head 42 of the line trimmer as clearly depicted in the drawing. In this manner, the housing is held in a firm fixed relationship to the line trimmer head.

In operation, the nut 52 connected to line trimmer shaft 26 is removed. The line trimmer spool and the head are then also removed. This leaves the bottom of the line trimmer with the threaded shaft being exposed to view. The impeller 14 is then placed upon the shaft and adjusted so that the hexagonal collar portion and hexagonal shaft portion form a telescopic relationship. Nut 52 is then replaced on the threaded shaft and securely tightened. The housing is then placed over the impeller and line trimmer head and secured by the use of stretch cords 16. The line trimmer may then be held vertically and is ready for use as a blower.

The housing 12 may be made of fiberglass, plastic, or any other suitable hard material. The housing is preferably made in a unitary construction in order to provide added strength and durability to the device. This construction also facilitates the attachment of the housing to the line trimmer. The impeller may also be made of fiberglass or any suitable hard plastic and is made in a unitary construction. In this manner, the device consists of only two main elements with the cords being standardly available stretch cords having the function of merely holding the housing to the line trimmer head.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An attachment apparatus for converting a portable hand held power apparatus having a head and drive shaft into a blower, comprising: an impeller; a housing for enclosing said impeller and a portion of the head, said housing comprising an impeller chamber surrounding said impeller, an intake port having a first vertically disposed portion opening to the surrounding atmosphere at its uppermost end and leading to a second intake portion at its lower end, said second portion having a covered bottom and covered sides and including a top having an aperture leading to said impeller chamber; and an outlet port connected to said impeller chamber and extending laterally from said impeller chamber in a substantially coplanar relation thereto and an attachment means for maintaining the housing in position upon the head.

2. The apparatus of claim 1 wherein said attachment means includes at least one stretchable cord having means for connection to said housing.

3. The apparatus of claim 2 wherein the impeller includes a plurality of impeller blades for moving air through the intake and outlet ports and a plurality of radially extending secondary blade means disposed above the impeller blades for providing air motion to inhibit debris from becoming tangled with the shaft.

4. An attachment apparatus for converting a line trimmer having a head and drive shaft into a blower comprising: an impeller; a housing for enclosing said impeller and a portion of the line trimmer head; and a flexible attachment means for maintaining the housing in position upon the line trimmer head, said housing comprising an intake port having one portion thereof extending vertically, an impeller chamber disposed in surmounting relation to a second portion of said intake port and an outlet port disposed in coplaner relation to said impeller chamber, and further wherein the impeller includes a plurality of impeller blades for moving air through the intake and outlet ports and a plurality of radially extending secondary blade means disposed above the impeller blades for providing air motion to inhibit debris from becoming entangled with the line trimmer shaft.

* * * * *